United States Patent
Tzur et al.

(10) Patent No.: US 11,328,076 B2
(45) Date of Patent: May 10, 2022

(54) COMMUNITY-BASED DATA SECURITY

(71) Applicant: Imperva, Inc., Redwood City, CA (US)

(72) Inventors: Doron Tzur, Modiin (IL); Shiri Margel, Petak Tikva (IL); Itsik Mantin, Shoham (IL)

(73) Assignee: Imperva, Inc., San Mateo, CA (US)

( * ) Notice: Subject to any disclaimer, the term of this patent is extended or adjusted under 35 U.S.C. 154(b) by 436 days.

(21) Appl. No.: 16/399,933

(22) Filed: Apr. 30, 2019

(65) Prior Publication Data
US 2020/0349270 A1   Nov. 5, 2020

(51) Int. Cl.
*G06F 21/62* (2013.01)
*G06N 20/00* (2019.01)
*G06F 21/55* (2013.01)

(52) U.S. Cl.
CPC ........ *G06F 21/6218* (2013.01); *G06F 21/552* (2013.01); *G06N 20/00* (2019.01); *G06F 2221/032* (2013.01)

(58) Field of Classification Search
CPC ............... G06F 21/6218; G06F 21/552; G06F 2221/032; G06F 16/283; G06N 20/00
See application file for complete search history.

(56) References Cited

U.S. PATENT DOCUMENTS

| | | | | |
|---|---|---|---|---|
| 10,339,420 | B1* | 7/2019 | Lecue | G06F 16/9024 |
| 10,943,461 | B2* | 3/2021 | Kleinbeck | G08G 5/0013 |
| 2018/0357247 | A1* | 12/2018 | Siminoff | G08B 13/19645 |
| 2019/0355269 | A1* | 11/2019 | Pan | G06K 9/46 |
| 2020/0285737 | A1* | 9/2020 | Kraus | G06F 21/552 |

* cited by examiner

*Primary Examiner* — Abiy Getachew
(74) *Attorney, Agent, or Firm* — Nicholson, De Vos, Webster & Elliott, LLP (57) ABSTRACT

A method by one or more electronic devices implementing a system for providing community-based data security, where the system is communicatively coupled to a plurality of database security analyzers, where each of the plurality of database security analyzers is configured to analyze data accesses to one or more databases associated with that database security analyzer. The method includes obtaining, for each of the plurality of database security analyzers, learning metadata generated by that database security analyzer, generating security parameters based on the learning metadata generated by the plurality of database security analyzers, and providing the security parameters to one or more of the plurality of database security analyzers to cause the one or more of the plurality of database security analyzers to apply the security parameters when analyzing data accesses to detect security incidents.

20 Claims, 5 Drawing Sheets

COMMUNITY-BASED DATA SECURITY

TECHNICAL FIELD

Embodiments of the invention relate to the field of data security, and more specifically, to providing community-based data security.

BACKGROUND ART

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

An enterprise may deploy a database activity monitoring (DAM) system in its enterprise network to monitor data accesses to one or more databases of the enterprise. The DAM system may generate a record/audit of the data accesses made to those databases, for example, in the form of data access logs and provide these data access logs to a database security analyzer for further analysis. The database security analyzer may analyze the data access logs to learn/deduce various information regarding the data accesses made to the databases of the enterprise. For example, the database security analyzer may analyze the data access logs to classify one or more entities accessing the databases of the enterprise into one or more entity types (e.g., an application user type vs. a non-application (e.g., human) user type). Also, the database security analyzer may analyze the data access logs to learn the normal/baseline data access patterns/tendencies of entities classified as being of a particular entity type (e.g., the number of queries submitted by entities classified as being of an application user type over a given period of time). The database security analyzer may then use this information to detect security incidents (e.g., by checking for data accesses that deviate from the normal/baseline data access patterns).

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

As mentioned above, an enterprise may deploy a database activity monitoring (DAM) system in its enterprise network to monitor data accesses to one or more databases of the enterprise. The DAM system may generate a record/audit of the data accesses made to those databases, for example, in the form of data access logs and provide these data access logs to a database security analyzer for further analysis. The database security analyzer may analyze the data access logs to learn/deduce various information regarding the data accesses made to the databases of the enterprise. The database security analyzer may then use this information to detect security incidents.

Multiple enterprise may each deploy/use a database security analyzer to analyze data accesses made to databases of that enterprise. However, the database security analyzer for an enterprise is isolated in that it only learns/deduces information based on analyzing data accesses that are local to the enterprise, which may limit its ability to learn/deduce information and its ability to detect security incidents, which in turn reduces data security. Embodiments provide a community-based data security feature that leverages information learned by multiple database security analyzers across multiple enterprises (a "community" of database security analyzers) to enhance the learning and security incident detection capabilities of individual database security analyzers.

Figure 1:
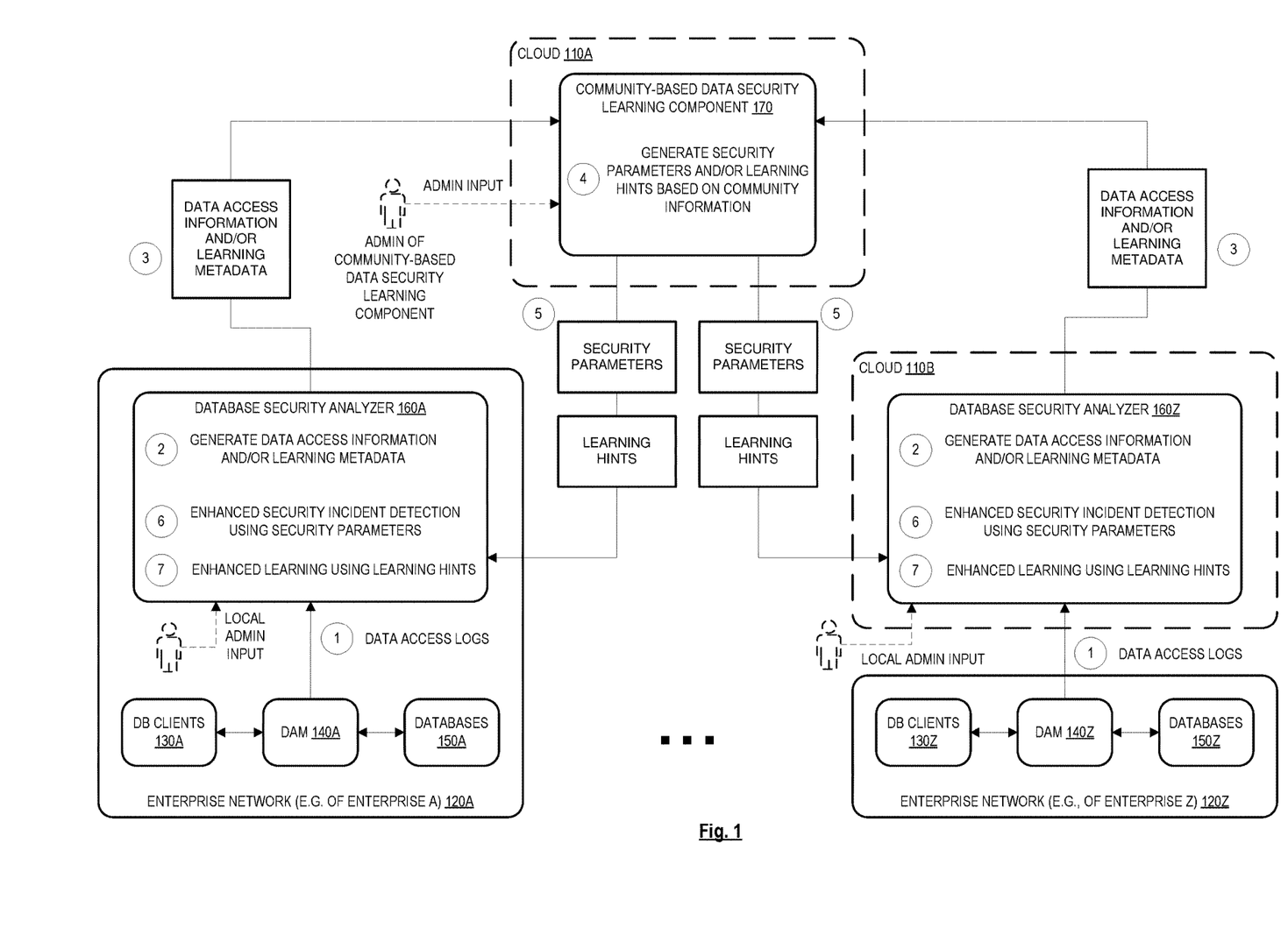
FIG. 1 is a block diagram illustrating a system for providing community-based data security, according to some embodiments.

FIG. 1 is a block diagram illustrating a system for providing community-based data security, according to some embodiments. As shown in the diagram, the system includes a cloud 110A and multiple enterprise networks 120. Cloud 110A includes a community-based data security learning component 170 for providing community-based data security and will be described in additional detail herein. Each of the enterprise networks 120A-Z may be owned/operated by or otherwise associated with a particular enterprise. For example, enterprise network 120A may be owned/operated by enterprise A and enterprise network 120Z may be owned/operated by enterprise Z. The enterprise network 120 of an enterprise may include a DAM system 140 communicatively coupled between database clients 130 and databases 150 of the enterprise. For example, as shown in the diagram, enterprise network 120A includes DAM system 140A that is communicatively coupled between database clients 130A and databases 150A while enterprise network 120Z includes DAM system 140Z that is communicatively coupled between database clients 130Z and databases 150Z. The DAM system 140 of an enterprise may monitor data accesses made by database clients 130 to databases 150 of the enterprise and generate a record/audit of those data accesses, for example, in the form of data access logs. These data access logs may include various information regarding data accesses made by database clients 130 to databases 150A (and may include the request/query and/or the response/result side of the data accesses).

A DAM system 140 may be implemented as a separate component or a separate virtual machine from the database servers hosting databases 150 or fully or partially integrated as an in-process agent within the database server. For example, the DAM system 140 may be implemented as a loadable kernel component that is configured to see data accesses made to databases hosted by the database server. Also, while the diagram shows DAM systems 140 deployed on-premise within enterprise networks 120, some DAM systems 140 may be deployed in a cloud (e.g., a cloud provided by a cloud provider). Also, DAM systems 140 may monitor data accesses in-line to the traffic being sent to/from the databases 150 or out-of-band (e.g., as a passive sniffer).

While the diagram shows database clients 130 accessing databases 150 of an enterprise from within the enterprise network 120 of the enterprise, some database clients 130 may access databases 150 of an enterprise from outside the enterprise network 120 of the enterprise (e.g., using secure shell (SSH) or other tunneling mechanism). However, regardless of where database clients 130 access databases 150 from, most or all data accesses made by database clients 130 to databases 150 of an enterprise may be monitored by the DAM system 140 of the enterprise.

The DAM system 140 of an enterprise may be communicatively coupled to a database security analyzer 160 associated with the enterprise. For example, DAM system 140A may be communicatively coupled to database security analyzer 160A (e.g., which is associated with enterprise A) and DAM system 140Z may be communicatively coupled to database security analyzer 160Z (e.g., which is associated with enterprise Z). The database security analyzer 160 associated with an enterprise may generate data access information and/or learning metadata based on analyzing data access logs generated by the DAM system 140 of the enterprise. The database security analyzer 160 may then provide this information/learning to the community-based data security learning component 170.

Data access information may include information related to data accesses made by database clients 130 to databases 150 of the enterprise. For example, this may include information related to the number of queries submitted to databases 150 of the enterprise over a period of time, the timing of queries submitted to databases 150 of the enterprise, the types of queries submitted to databases 150 of the enterprise, the lengths of query sentences submitted to databases 150 of the enterprise, the names of databases 150 of the enterprise that were accessed, and the rate of queries submitted to databases 150 of the enterprise.

Learning metadata may include information learned by the database security analyzer 160 from analyzing data accesses made by database clients 130 to databases 150 of the enterprise. For example, this may include classifications made by the database security analyzer 160 of entities accessing databases 150 of the enterprise, classifications made by the database security analyzer 160 of databases 150 of the enterprise, and/or classifications made by the database security analyzer 160 of data objects (e.g., database tables) in the databases 150 of the enterprise. The database security analyzer 160 may classify entities into different entity types. For example, the database security analyzer 160 may classify one or more entities as being either an application user type or a non-application (e.g., interactive human) user type, where the application user type is a type of user that submits application-generated queries, and where the non-application user type is a type of user that that submits ad-hoc queries. Additionally or alternatively, the database security analyzer 160 may classify one or more entities as being either a client machine type, a jump server type, a database server type, or an application server type. In one embodiment, the learning metadata includes data access information per entity type (e.g., the number of queries submitted by entities classified by the database security analyzer 160 as being of a particular entity type over a period of time). The database security analyzer 160 may classify databases 150 into different database types. For example, the database security analyzer 160 may classify one or more databases 150 as being either a sensitive database or a non-sensitive database. Additionally or alternatively, the database security analyzer 160 may classify one or more databases 150 as being either an online analytical processing (OLAP) database or an online transactional processing (OLTP) database. The database security analyzer 160 may classify database objects into different database object types. For example, the database security analyzer 160 may classify one or more database objects as being either a system database object or a non-system database object. Additionally or alternatively, the database security analyzer 160 may classify one or more databases objects as being either a sensitive database object or a non-sensitive database object. In one embodiment, learning metadata includes confidence levels of the information learned by database security analyzer 160 (e.g., confidence levels of classifications). In one embodiment, the database security analyzer 160 generates learning metadata based on input provided by a local administrator (e.g., an administrator of the enterprise network 120). For example, a local administrator may provide information to the database security analyzer 160 that will help the database security analyzer 160 classify entities/databases/objects based on that local administrator's expert knowledge (e.g., the local administrator may know that a particular entity is of the non-application user type and provide this information to the database security analyzer 160).

In general, the learning metadata should include information learned by the database security analyzer 160 that is relevant for the community of database security analyzers 160 (e.g., information regarding system database objects or other database objects that are common across databases of more than one enterprise) and should not include information that is specific to a particular enterprise (e.g., business data of customers of the enterprise).

Thus, data access information can be seen as relatively "raw" and unprocessed information regarding data accesses made to the databases 150 of the enterprise while learning metadata can be seen as learned/processed information that is generated based on analyzing data accesses made to the databases 150 of the enterprise.

Database security analyzers 160 may be deployed on-premise (e.g., within an enterprise network 120) or deployed off-premise (e.g., in the cloud). For example, as shown in the diagram, database security analyzer 160A is deployed on-premise within enterprise network 120A while database security analyzer 160Z is deployed off-premise in cloud 110B.

As mentioned above, cloud 110A includes a community-based data security learning component 170. The community-based data security learning component 170 may be implemented by one or more electronic devices (e.g., in cloud 110A). The community-based data security learning component 170 may obtain data access information and/or learning metadata generated by multiple database security analyzers 160 associated with different enterprises (a community of database security analyzers 160) and generate security parameters and/or learning hints based on this information/learning. The community-based data security learning component 170 may then provide the generated security parameters and/or learning hints to one or more database security analyzers 160 to enhance the security incident detection and/or learning of those database security analyzers 160.

Security parameters are parameters/values that can be used by database security analyzers 160 for security incident detection. In one embodiment, security parameters include a threshold value for a threshold-based security rule. For example, the community-based data security learning component 170 may learn (based on analyzing information generated by the community of database security analyzers 160) the typical/average/median number and rate of data accesses made by entities classified as being of a particular entity type. The community-based data security learning component 170 may use this number/rate to determine a threshold value for a security rule such that if an entity classified as being of the particular entity type makes a number of data accesses that exceed the threshold value then the security rule flags this as a security incident. The community-based data security learning component 170 may then provide this threshold value as a security parameter to one or more database security analyzers 160. As another example, the community-based data security learning component 170 may learn (based on analyzing information generated by the community of database security analyzers 160) that an overwhelming majority (e.g., more than 99 percent) of entities classified as being of the non-application (e.g., interactive human) user type access less than 10,000 data items within an hour. Based on this, the community-based data security learning component 170 may determine the threshold value for a security rule such that if an entity classified as being of the non-application user type accesses more than 10,000 data items within an hour then the security rule flags this as a security incident. The community-based data security learning component 170 may then provide this threshold value as a security parameter to one or more database security analyzers 160. In one embodiment, security parameters include a list of values that can be used to detect security incidents. For example, the community-based data security learning component 170 may learn (based on analyzing information generated by the community of database security analyzers 160) the names of system database objects that have been classified as being sensitive database objects that should not be accessed by entities classified as being of the non-application user type. Based on this, the community-based data security learning component 170 may provide a list of the names of such database objects to one or more database security analyzers 160 so that those database security analyzers 160 can detect when an entity classified as being of the non-application user type accesses (or attempts to access) any of the database objects referenced in the list of names and flag this as a security incident. As another example, the community-based data security learning component 170 may learn (based on analyzing information generated by the community of database security analyzers 160) that certain commands/queries should not be submitted by entities classified as being of the non-application user type. Based on this, the community-based data security learning component 170 may provide a list of such commands/queries to one or more database security analyzers 160 so that those database security analyzers 160 can detect when an entity classified as being of the non-application user type submits any of the commands referenced in the list and flag this as a security incident. As yet another example, the community-based data security learning component 170 may learn (based on analyzing information generated by the community of database security analyzers 160) that certain database objects are typically accessed by entities classified as being automated tools. Based on this, the community-based data security learning component 170 may provide a list of names of such database objects to one or more database security analyzers 160 so that those database security analyzers 160 can detect when an entity that is not classified as being an automated tool accesses any the database objects referenced in the list of names and flag this as a security incident. In one embodiment, the community-based data security learning component 170 may determine the most popular security parameter settings used by the community of database security analyzers 160 and recommend these settings to one or more database security analyzers 160 so that those database security analyzers 160 can apply those settings.

Learning hints are hints/information that help database security analyzers 160 with learning/deducing information. In one embodiment, learning hints may include a condition when an entity is to be classified as being of a particular entity type and/or when an entity is not to be classified as being of a particular entity type. For example, the community-based data security learning component 170 may learn (based on analyzing information generated by the community of database security analyzers 160) that all of the data accesses made by entities classified as being of the application user type submit queries at a rate that is greater than 5 queries per second. Based on this, the community-based data security learning component 170 may generate a learning hint indicating that any entities having a query rate of less than 5 queries per second are not to be classified as being of the application user type. The community-based data security learning component 170 may then provide this learning hint to one or more database security analyzers 160. As another example, the community-based data security learning component 170 may learn (based on analyzing information generated by the community of database security analyzers 160) that entities classified as being of a particular entity type (e.g., thick application type) always (or almost always) access more than seven system database objects before accessing any other database objects. Based on this, the community-based data security learning component 170 may generate a learning hint indicating that any entities that access seven or less system database objects at the beginning of their database connections are not to be classified as being of that particular entity type. The community-based data security learning component 170 may then provide this learning hint to one or more database security analyzers 160. As yet another example, the community-based data security learning component 170 may learn (based on analyzing information generated by the community of database security analyzers 160) that an entity making 20,000 data accesses per day is indicative of that entity being of the application server type. Based on this, the community-based data security learning component 170 may generate a learning hint indicating that entities that make at least 20,000 data access per day are to be classified as being of the application server type. The community-based data security learning component 170 may then provide this learning hint to one or more database security analyzers 160. In one embodiment, learning hints may include confidence levels of security incidents detected by database security analyzers 160. For example, the community-based data security learning component 170 may learn the confidence levels assigned by local administrators to security incidents (confidence that the security incident is a true positive vs. a false positive). Based on this, the community-based data security learning component 170 may generate a learning hint indicating these confidence levels and send this learning hint to one or more database security analyzers 160 (e.g., which may help those database security analyzers 160 identify incidents that are prone to being false positives).

In one embodiment, the community-based data security learning component 170 generates security parameters and/or learning hints further based on input provided by an administrator of the community-based data security learning component 170. For example, the administrator of the community-based data security learning component 170 may provide information to the community-based data security learning component 170 based on the administrator's expert/industry knowledge that helps the community-based data security learning component 170 generate suitable security parameters and/or learning hints (e.g., the administrator of the community-based data security learning component 170 may know that certain database objects should never be accessed by an entity classified as being of the non-application user type and provide this information to the community-based data security learning component 170).

In one embodiment, the community-based data security learning component 170 builds profiles of data access behaviors/patterns (based on information generated by the community of database security analyzers 160) and provides these profiles to one or more database security analyzers 160, which may use the profiles to detect security incidents and for learning purposes. For example, the community-based data security learning component 170 may build a profile of data access behaviors/patterns of different applications and provide this profile to one or more database security analyzers 160, which may use the profile to detect security incidents (e.g., data accesses made by a particular application that do not fit the profile) or for learning purposes (e.g., to classify an entity as being of the application user type). As another example, the community-based data security learning component 170 may build a profile of data access behaviors/patterns of a particular client tool (e.g., Toad) and provide this profile to one or more database security analyzers 160, which may use the profile to detect security incidents (e.g., data accesses made using that particular client tool that do not fit the profile) or for learning purposes (e.g., to learn that an entity is using that particular client tool).

The database security analyzers 160 may use the security parameters and/or learning hints provided by the community-based data security learning component 170 to enhance security incident detection and/or enhance its learning. For example, a database security analyzer 160 may apply the security parameters provided by the community-based data security learning component 170 when analyzing data accesses to detect security incidents and/or use the learning hints provided by the community-based data security learning component 170 when analyzing data accesses to learn/deduce various information regarding the data accesses being made to the databases (e.g., which results in generating additional learning metadata). In one embodiment, the database security analyzer 160 may provide the additional learning metadata it learned using the learning hints (as well as updated data access information in some cases) to the community-based data security learning component 170 so that the community-based data security learning component 170 can generate updated security parameters and/or learning hints based on the additional learning metadata. Thus, the community-based data security learning component 170 may iteratively generate security parameters and/or learning hints as it obtains more information from the database security analyzers 160.

Exemplary operations for providing community-based data security will now be described with reference to FIG. 1. At circle 1, DAM system 140A generates data access logs for data accesses made by database clients 130A to databases 150A and provides these data access logs to database security analyzer 160A. In a similar manner, DAM system 140Z generates data access logs for data accesses made by database clients 130Z to databases 150Z and provides these data access logs to database security analyzer 160Z. The DAM systems 140 of other enterprises (not shown) may also perform similar operations.

At circle 2, database security analyzer 160A generates data access information and/or learning metadata based on analyzing the data access logs provided by DAM system 140A. Database security analyzer 160Z may also generate data access information and learning metadata in a similar manner but based on analyzing the data access logs provided by DAM system 140Z. The database security analyzers 160 associated with other enterprises (not shown) may also perform similar operations.

At circle 3, database security analyzer 160A and database security analyzer 160Z provide the data access information and/or learning metadata it generated to the community-based data security learning component 170. Other database security analyzers 160 associated with other enterprises (not shown) may also provide the data access information and/or learning metadata it generated to the community-based data security learning component 170. The data access information and/or learning metadata may be provided to the community-based data security learning component 170 by the database security analyzers 160 "pushing" the information/data to the community-based data security learning component 170 or by the community-based data security learning component 170 "pulling" the information/data from the database security analyzers 160 (or from a storage location where the information/data is accumulated). Thus, the community-based data security learning component 170 is provided with data access information and/or learning metadata generated by a community of database security analyzers 160.

At circle 4, the community-based data security learning component 170 generates security parameters and/or learning hints based on the data access information and/or learning metadata provided by the multiple database security analyzers 160 (e.g., as described above).

At circle 5, the community-based data security learning component 170 provides the security parameters and/or learning hints to database security analyzer 160A and database security analyzer 160Z (and possibly other database security analyzers 160 as well). The security parameters and/or learning hints may be provided to the database security analyzers 160 by the community-based data security learning component 170 "pushing" the information/data to the database security analyzers 160 or by the database security analyzers 160 "pulling" the information/data from the community-based data security learning component 170 (or from a storage location where the information/data is accumulated). In some embodiments, the community-based data security learning component 170 provides security parameters and/or learning hints only to those database security analyzers 160 that provided data access information and/or learning metadata it generated to the community-based data security learning component 170, while in other embodiments, the community-based data security learning component 170 may provide security parameters and/or learning hints even to some database security analyzers 160 that did not provide data access information and/or learning metadata to the community-based data security learning component 170. That is, it is not required that a database security analyzer 160 participate in providing information to the community-based data security learning component 170 to benefit from the community-based data security provided by the community-based data security learning component 170.

At circle 6, database security analyzer 160A and database security analyzer 160Z use the security parameters to perform enhanced security incident detection. Also, in one embodiment, at circle 7, database security analyzer 160A and database security analyzer 160Z may use the learning hints to perform enhanced learning.

Figure 2:
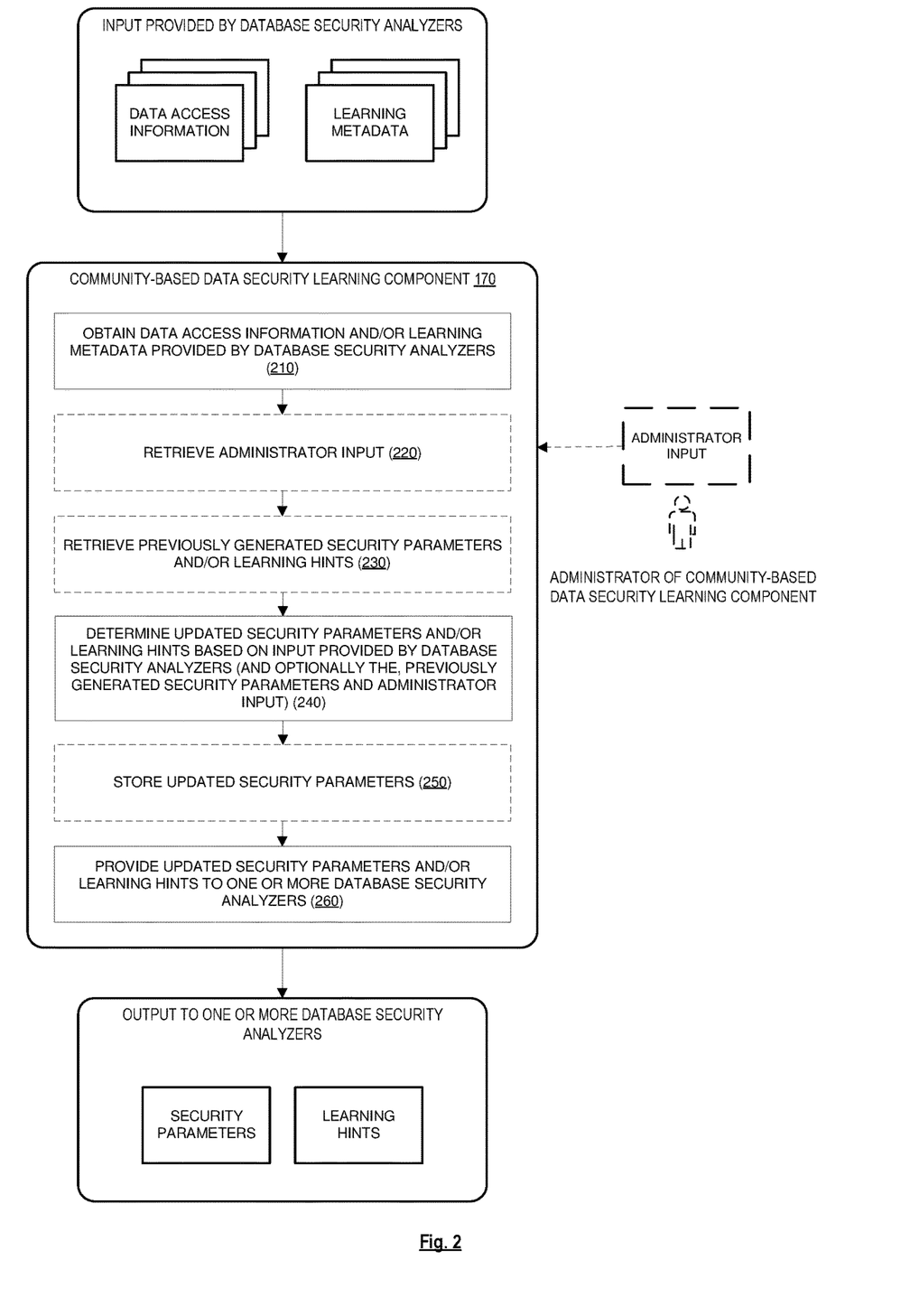
FIG. 2 is a block diagram and flow diagram illustrating operations of the community-based data security learning component, according to some embodiments.

FIG. 2 is a combined block diagram and flow diagram illustrating operations of the community-based data security learning component, according to some embodiments. As shown in the diagram, at block 210, the community-based data security learning component 170 obtains input provided by multiple database security analyzers. This input may include data access information and/or learning metadata generated by the database security analyzers. For example, this input may include a list of names of database objects that the database security analyzers have determined as typically being accessed by automated tools. In one embodiment, at block 220, the community-based data security learning component 170 retrieves input provided by an administrator of the community-based data security learning component 170. For example, this input may include a list of names of database objects that the administrator has determined (based on expert/industry knowledge) as typically being accessed by automated tools (as well as a confidence level that this is the case). In one embodiment, at block 230, the community-based data security learning component 170 retrieves the previously generated security parameters and/or learning hints (if any—e.g., from a database). For example, this may include a list of names of database objects that the community-based data security learning component 170 previously determined to be accessed by automated tools and provided to database security analyzers (e.g., in a previous iteration). At block 240, the community-based data security learning component 170 determines new/updated security parameters and/or learning hints based on the input provided by the database security analyzers (and optionally the previously generated security parameters and/or learning metadata and/or administrator input). For example, this may involve the community-based data security learning component 170 merging the list of database object names provided by the database security analyzers, the list of database object names previously provided to the database security analyzers, and the list of database object names provided by the administrator of the community-based data security learning component 170. If there are conflicts, the community-based data security learning component 170 may decide which database object names to include/exclude based on the confidence levels. In on embodiment, at block 250, the community-based data security learning component 170 stores the new/updated security parameters and/or learning metadata (e.g., in a database) and at block 260, provides the new/updated security parameters and/or learning hints to one or more database security analyzers. For example, the community-based data security learning component 170 may store the merged list of database object names and provide this list to one or more database security analyzers so that those database security analyzers can use the list for security incident detection and/or learning purposes.

Figure 3:
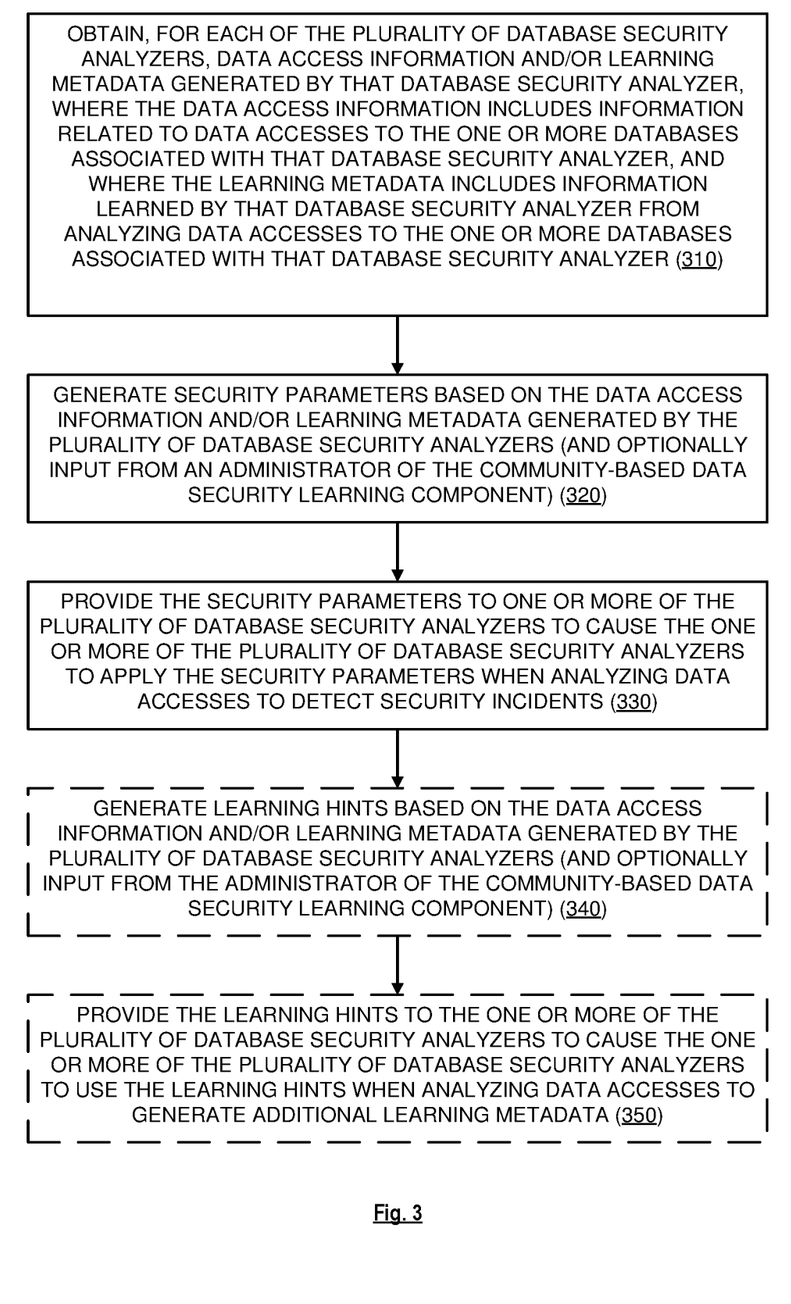
FIG. 3 is a flow diagram of a process for providing community-based data security, according to some embodiments.

FIG. 3 is a flow diagram of a process for providing community-based data security, according to some embodiments. In one embodiment, the process is implemented by one or more electronic devices implementing a system that includes a community-based data security learning component 170 (e.g., one or more electronic devices in cloud 110A).

In one embodiment, the process is initiated at block 310 when the system obtains, for each of the plurality of database security analyzers, data access information and/or learning metadata generated by that database security analyzer, where the data access information includes information related to data accesses to the one or more databases associated with that database security analyzer (e.g., databases of the enterprise associated with that database security analyzer), and where the learning metadata includes information learned by that database security analyzer from analyzing data accesses to the one or more databases associated with that database security analyzer.

At block 320, the system generates security parameters based on the data access information and/or learning metadata generated by the plurality of database security analyzers. In one embodiment, the system further generates the security parameters based on input from an administrator of the community-based data security learning component.

At block 330, the system provides the security parameters to one or more of the plurality of database security analyzers to cause the one or more of the plurality of database security analyzers to apply the security parameters when analyzing data accesses to detect security incidents.

In one embodiment, at block 340, the system generates learning hints based on the data access information and/or learning metadata generated by the plurality of database security analyzers. In one embodiment, the system further generates learning hints based on input from the administrator of a community-based data security learning component.

In one embodiment, at block 350, the system provides the learning hints to the one or more of the plurality of database security analyzers to cause the one or more of the plurality of database security analyzers to use the learning hints when analyzing data accesses to generate additional learning metadata.

Figure 4:
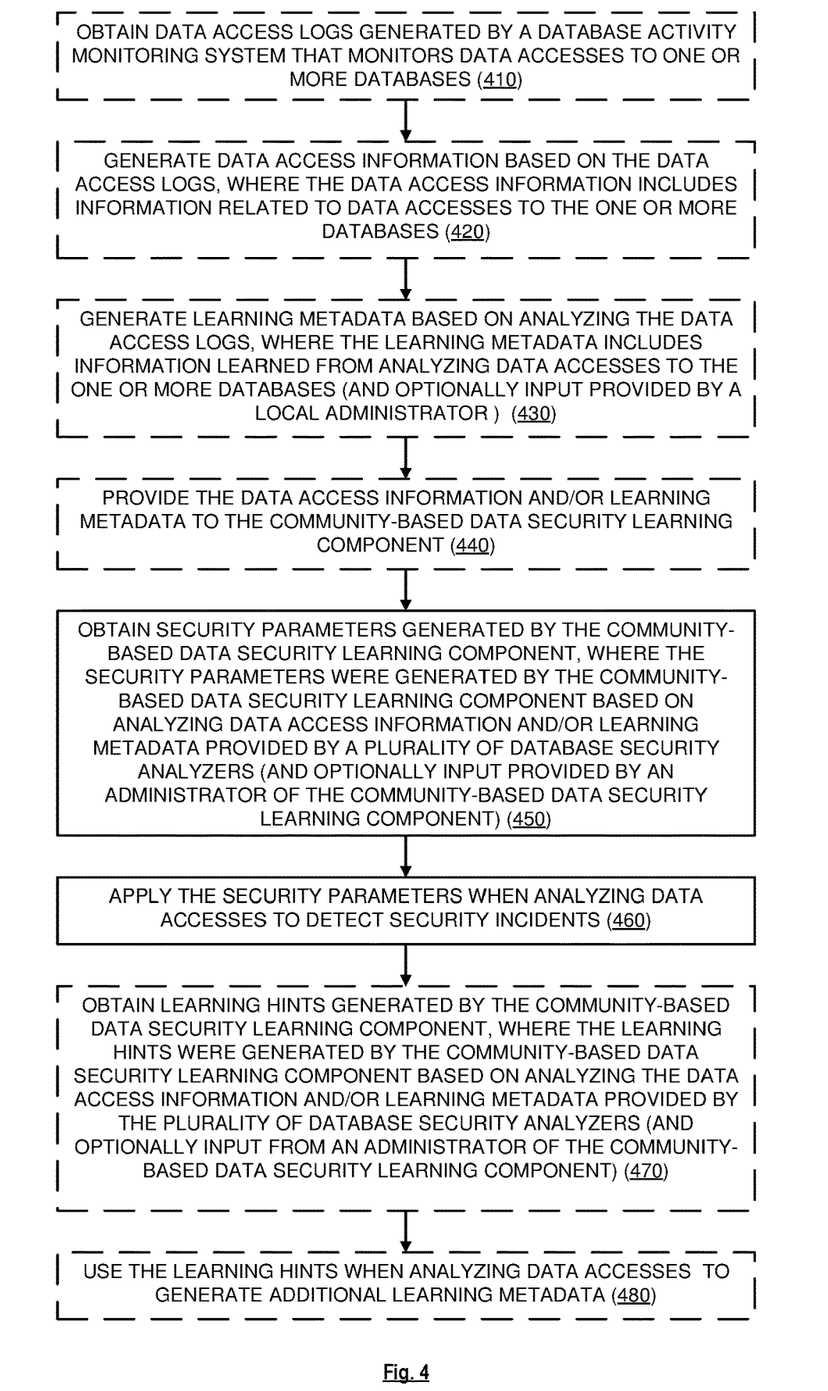
FIG. 4 is a flow diagram of a process for detecting security incidents using community-based data security, according to some embodiments.

FIG. 4 is a flow diagram of a process for detecting security incidents using community-based data security, according to some embodiments. In one embodiment, the process is implemented by one or more electronic devices implementing a database security analyzer 160.

In one embodiment, the process is initiated at block 410 when the database security analyzer obtains data access logs generated by a database activity monitoring system that monitors data accesses to one or more databases (e.g., databases of an enterprise).

In one embodiment, at block 420, the database security analyzer generates data access information based on the data access logs, where the data access information includes information related to data accesses to the one or more databases.

In one embodiment, at block 430, the database security analyzer generates learning metadata based on analyzing the data access logs, where the learning metadata includes information learned from analyzing data accesses to the one or more databases. In one embodiment, the database security analyzer further generates the learning metadata based on input provided by a local administrator.

In one embodiment, at block 440, the database security analyzer provides the data access information and/or learning metadata to a community-based data security learning component (e.g., implemented in cloud 110A).

At block 450, the database security analyzer obtains security parameters generated by the community-based data security learning component, where the security parameters were generated by the community-based data security learning component based on analyzing data access information and/or learning metadata provided by a plurality of database security analyzers. In one embodiment, the security parameters were further generated by the community-based data security learning component based on input provided by an administrator of the community-based data security learning component. At block 460, the database security analyzer applies the security parameters when analyzing data accesses to detect security incidents.

In one embodiment, at block 470, the database security analyzer obtains learning hints generated by the community-based data security learning component, where the learning hints were generated by the community-based data security learning component based on analyzing the data access information and/or learning metadata provided by the plurality of database security analyzers. In one embodiment, the learning hints were further generated by the database security analyzer based on input provided by an administrator of the community-based data security learning component. In one embodiment, at block 480, the database security analyzer uses the learning hints when analyzing data accesses to generate additional learning metadata.

Figure 5:
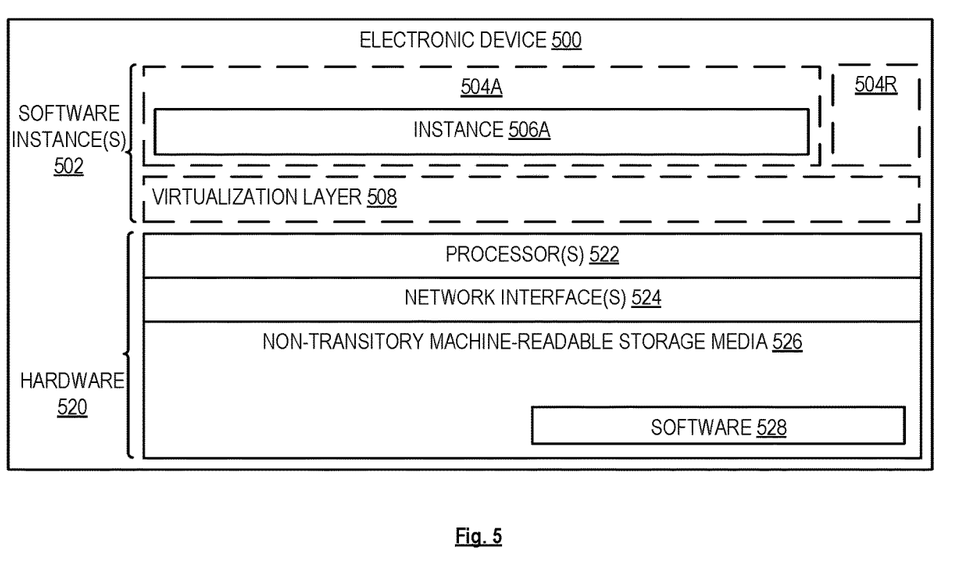
FIG. 5 is a block diagram illustrating an electronic device, according to some embodiments.

FIG. 5 is a block diagram illustrating an electronic device, according to some embodiments. FIG. 5 shows hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Software 528 can include code, which when executed by hardware 520, causes the electronic device 500 to perform operations of one or more embodiments described herein. Thus, as previously described, the community-based data security learning component 170 may be implemented in one or more electronic devices. Also, the database clients 130, the DAM systems 140, and the database security analyzers 160 may each be implemented in in one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more electronic devices implementing a system for providing community-based data security, wherein the system includes a community-based data security learning component that is communicatively coupled to a plurality of database security analyzers, wherein each of the plurality of database security analyzers is configured to analyze data accesses to one or more databases associated with that database security analyzer, the method comprising:

obtaining, for each of the plurality of database security analyzers, learning metadata generated by that database security analyzer, wherein the learning metadata includes information learned by that database security analyzer from analyzing data accesses to the one or more databases associated with that database security analyzer;

generating security parameters based on the learning metadata generated by the plurality of database security analyzers; and  providing the security parameters to one or more of the plurality of database security analyzers to cause the one or more of the plurality of database security analyzers to apply the security parameters when analyzing data accesses to detect security incidents.

2. The method of claim 1, further comprising:
obtaining, for each of the plurality of database security analyzers, data access information generated by that database security analyzer, wherein the data access information includes information related to data accesses to the one or more databases associated with that database security analyzer.

3. The method of claim 2, wherein the security parameters are further generated based on the data access information generated by the plurality of database security analyzers.

4. The method of claim 2, further comprising:
generating learning hints based on the data access information and/or learning metadata generated by the plurality of database security analyzers; and
providing the learning hints to the one or more of the plurality of database security analyzers to cause the one or more of the plurality of database security analyzers to use the learning hints when analyzing data accesses to generate additional learning metadata.

5. The method of claim 4, wherein the generating the security parameters or the generating the learning hints is further based on input provided by an administrator of the community-based data security learning component.

6. The method of claim 4, wherein the learning hints include a condition when an entity is to be classified as being of a particular entity type or when an entity is not to be classified as being of a particular entity type.

7. The method of claim 2, wherein the data access information generated by a particular one of the plurality of database security analyzers includes information related to one or more of: a number of queries submitted to the one or more databases associated with that particular database security analyzer over a period of time, timing of queries submitted to the one or more databases associated with that particular database security analyzer, types of queries submitted to the one or more databases associated with that particular database security analyzer, lengths of query sentences submitted to the one or more databases associated with that particular database security analyzer, which of the one or more databases associated with that particular database security analyzer were accessed, and rates of queries submitted to the one or more databases associated with that particular database security analyzer.

8. The method of claim 2, wherein the learning metadata generated by a particular one of the plurality of database security analyzers includes data access information for each of a plurality of entity types that includes information related to data accesses to the one or more databases associated with that particular database security analyzer made by entities classified by that particular database security analyzer as being of that entity type.

9. The method of claim 8, wherein the plurality of entity types includes an application user type and a non-application user type, wherein the application user type is a type of user that submits application-generated queries, and wherein the non-application user type is a type of user that that submits ad-hoc queries.

10. The method of claim 9, wherein the security parameters include a list of one or more database tables that should not be accessed by an entity classified as being of a non-application user type.

11. The method of claim 8, wherein the plurality of entity types includes a client machine type, a jump server type, a database server type, and an application server type.

12. The method of claim 1, wherein the learning metadata generated by a particular one of the plurality of database security analyzers includes a confidence level of the information learned by that particular database security analyzer.

13. The method of claim 1, wherein the learning metadata generated by a particular one of the plurality of database security analyzers is generated based on input provided to that particular database security analyzer by an administrator associated with that particular database security analyzer.

14. The method of claim 1, wherein the security parameters include a threshold value for a threshold-based security rule.

15. A set of one or more non-transitory machine-readable storage media storing instructions, which when executed by one or more processors of one or more electronic devices, causes the one or more electronic devices implementing a security system to perform operations for providing community-based data security, wherein the security system is communicatively coupled to a plurality of database security analyzers, wherein each of the plurality of database security analyzers is configured to analyze data accesses to one or more databases associated with that database security analyzer, the operations comprising:
obtaining, for each of the plurality of database security analyzers, learning metadata generated by that database security analyzer, wherein the learning metadata includes information learned by that database security analyzer from analyzing data accesses to the one or more databases associated with that database security analyzer;
generating security parameters based on the learning metadata generated by the plurality of database security analyzers; and
providing the security parameters to one or more of the plurality of database security analyzers to cause the one or more of the plurality of database security analyzers to apply the security parameters when analyzing data accesses to detect security incidents.

16. The set of one or more non-transitory machine-readable storage media of claim 15, wherein the operations further comprise:
obtaining, for each of the plurality of database security analyzers, data access information generated by that database security analyzer, wherein the data access information includes information related to data accesses to the one or more databases associated with that database security analyzer.

17. The set of one or more non-transitory machine-readable storage media of claim 16, wherein the security parameters are further generated based on the data access information generated by the plurality of database security analyzers.

18. The set of one or more non-transitory machine-readable storage media of claim 16, wherein the operations further comprise:
generating learning hints based on the data access information and/or learning metadata generated by the plurality of database security analyzers; and
providing the learning hints to the one or more of the plurality of database security analyzers to cause the one or more of the plurality of database security analyzers to use the learning hints when analyzing data accesses to generate additional learning metadata.

19. An electronic device to implement a system for providing community-based data security, wherein the system is to be communicatively coupled to a plurality of database security analyzers, wherein each of the plurality of database security analyzers is configured to analyze data accesses to one or more databases associated with that database security analyzer, the electronic device comprising:
one or more processors; and
a non-transitory machine-readable storage medium having instructions stored therein, which when executed by the one or more processors, causes the electronic device to:
obtain, for each of the plurality of database security analyzers, data access information generated by that database security analyzer and/or learning metadata generated by that database security analyzer, wherein the data access information includes information related to data accesses to the one or more databases associated with that database security analyzer, and wherein the learning metadata includes information learned by that database security analyzer from analyzing data accesses to the one or more databases associated with that database security analyzer;
generate security parameters based on the data access information and/or learning metadata generated by the plurality of database security analyzers; and
provide the security parameters to one or more of the plurality of database security analyzers to cause the one or more of the plurality of database security analyzers to apply the security parameters when analyzing data accesses to detect security incidents.

20. The electronic device of claim 17, wherein the instructions, when executed by the one or more processors, further causes the electronic device to:
generate learning hints based on the data access information and/or learning metadata generated by the plurality of database security analyzers; and
provide the learning hints to the one or more of the plurality of database security analyzers to cause the one or more of the plurality of database security analyzers to use the learning hints when analyzing data accesses to generate additional learning metadata.

* * * * *